United States Patent [19]

Ayroldi

[11] Patent Number: 4,511,470
[45] Date of Patent: Apr. 16, 1985

[54] APPARATUS FOR THE RECOVERY OF OILS OR OTHER SIMILAR SUBSTANCES FLOATING ON STREAMING WATER COURSES

[76] Inventor: Giuseppe Ayroldi, Via Guido Zanobini, N., Rome, 55, Italy

[21] Appl. No.: 585,230

[22] Filed: Mar. 1, 1984

[30] Foreign Application Priority Data

Mar. 1, 1983 [IT] Italy ............... 47830 A83

[51] Int. Cl.³ .............................................. C02F 1/40
[52] U.S. Cl. .................... 210/242.3; 210/540; 210/923
[58] Field of Search ............ 210/776, 242.3, 538, 210/540, 923, 236

[56] References Cited

U.S. PATENT DOCUMENTS

| | | | |
|---|---|---|---|
| 3,708,070 | 1/1973 | Bell | 210/242.3 |
| 3,822,789 | 7/1974 | Crisafulli | 210/242.3 |
| 3,966,614 | 6/1976 | Ayers | 210/776 |
| 3,966,615 | 6/1976 | Petchul | 210/776 |
| 3,970,556 | 7/1976 | Gore | 210/776 |
| 4,108,773 | 8/1978 | Macaluso | 210/242.3 |
| 4,111,811 | 9/1978 | Fukuda | 210/242.3 |
| 4,165,282 | 8/1979 | Bennett | 210/242.3 |
| 4,257,889 | 3/1981 | Weber | 210/242.3 |
| 4,372,854 | 2/1983 | Szereday | 210/242.3 |

Primary Examiner—Ernest G. Therkorn
Attorney, Agent, or Firm—Bernard, Rothwell & Brown

[57] ABSTRACT

An apparatus for retrieving hydrocarbon or similar products floating on waterways comprising: a floating skimming platform; an auxiliary floating support platform connected to the skimming platform but with an independent floating capability. The skimming platform includes two lateral floats set at a distance from each other and supporting a central structure including an intake channel or having at least two sections of an increasing slope, with access thresholds and exit apertures for each; a rear chamber fitted with retrieval facilities to transfer the recovered oil to storage tanks or ground facilities, and preceded by the vertical threshold which can rotate about a transverse axis and that responds to the variations of the liquid level in the rear chamber.

7 Claims, 5 Drawing Figures

APPARATUS FOR THE RECOVERY OF OILS OR OTHER SIMILAR SUBSTANCES FLOATING ON STREAMING WATER COURSES

BACKGROUND OF THE INVENTION

1. Field of the Invention

This invention relates to an apparatus for the recovery of oil, hydrocarbon or other liquid substances floating on streaming bodies of water such as rivers and canals.

2. Prior Art

The ecological damages caused to water courses by accidental pouring of hydrocarbons and/or other floating oily substances are well known. These chemicals, in fact, pollute not only the water courses but also the surrounding terrain.

To overcome such harmful effects, a variety of devices have already been developed, based on several different concepts. None of these systems has, however, effectively solved the problem; furthermore, they are complicated and expensive, in addition to being inefficient.

SUMMARY OF THE INVENTION

This invention concerns an apparatus specifically for operating even in fast-flowing water courses that ensures simple and quick operation as well as a high degree of reliability and efficiency.

The equipment basically comprises: a free-floating skimming platform, which has the specific purpose of removing the floating oils and to send them to inner chambers, where the oil will be collected and then taken to ground facilities or storage tanks by means of a suction pipe connected to a pump; and of a support platform, to which the skimming platform is linked. This second support platform supports all the services and the forces connected with the use of the skimming apparatus, such as the mooring facilities, the pumping unit and a service bridge. The support platform is also fitted with a grid structure to block any large floating objects, as well as two floating arms whose angular opening can be adjusted according to each specific operating condition. Booms can also be mounted on the floating arm to increase the equipment's intake.

However, in narrow water courses, the equipment can be reduced to only the water-skimming platform, without the support platform. In this case, the skimming platform will be moored to the river bank, on which the pumping and storage facilities will be assembled.

DETAILED DESCRIPTION OF THE PREFERRED EMBODIMENT

Figure 1:
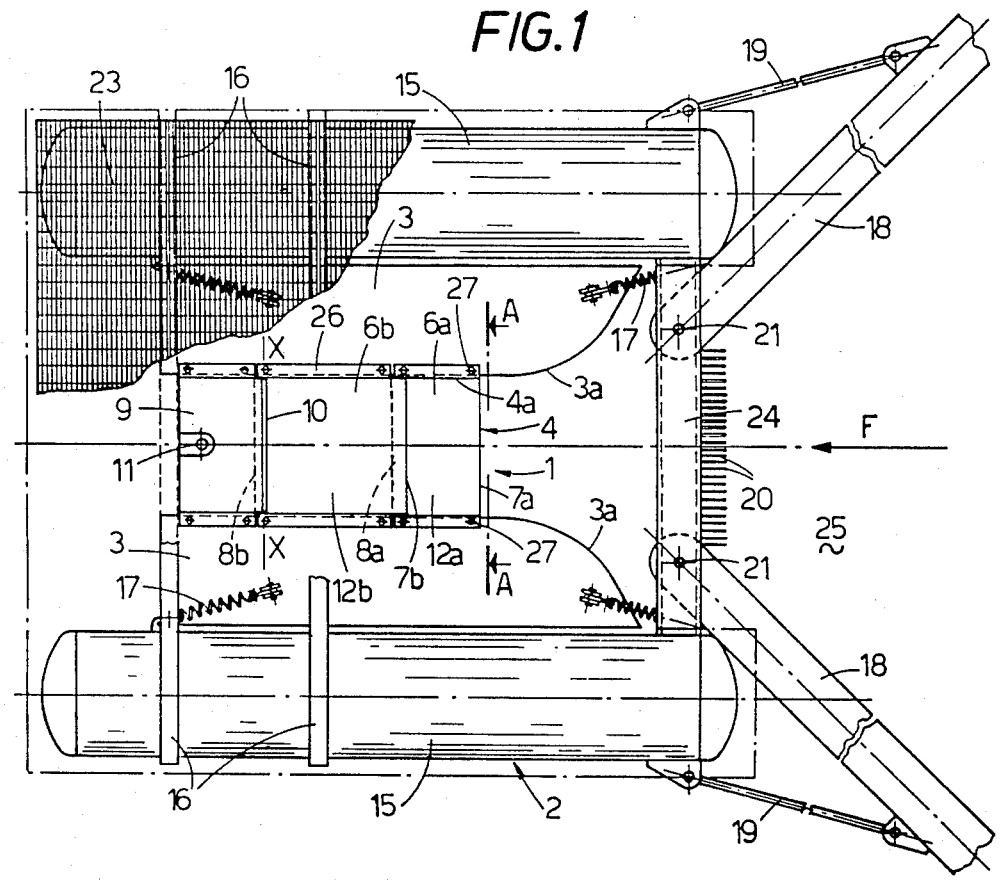
FIG. 1 shows a schematic diagram (top view) of the equipment.

With reference to the drawings, the numeral 1 is the water-skimming platform and 2 the support platform. The skimming platform 1 includes two wide, longitudinal floats 3, separated from each other so as to support between them the skimming facilities, i.e., an intake channel 4 which leads to a rear oil-receiving chamber 9, where a suction pipe 11 operates when connected to a standard type of pumping equipment (not shown) fitted with the necessary controls in order to set the correct pump's head pressure and rate of flow, depending on the requirements of the moment; the pump can be located either on the support platform or on the riverbank.

The lateral floats 3 of the skimming platform 1 are large in terms of length and width, but are small in the vertical direction, in order to let them be slightly submerged under the water level, so as to be only slightly affected by the stream's dynamic forces. This arrangement makes it possible to automatically and easily maintain the threshold of the intake channel slightly below water level and at a constant depth. The latter can be adjusted depending on both the velocity of the stream and the thickness of the floating oil.

Successive sections of the intake channel 4 have the shape of rectangles of equal width, but of different heights, because the bottom is sloped. The intake channel is formed by nearly vertical side panels and shaped bottom panels. In the configuration shown, the intake channel 4 is divided into two successive sections 12a, 12b, see FIG. 2. Sections 12a and 12b are designed as two independent assemblies, so their heights may be independently adjusted. The first section 12a has side vertical panels 4a and a bottom panel 6a, whose front edge is the threshold 7a of the intake channel 4. The bottom panel 6a has a constant inclination in the direction of the arrow F, so that section 12a gets deeper moving away from the threshold 7a towards the internal zone of section 12a itself. The rear end of section 12a is lower and farther back than threshold 7b of section 12b, so as to form a transverse aperture 8a. Section 12b in turn includes the threshold 7b, side panels 4b and shaped bottom panel 6b. In its recommended form, the bottom panel's (6b) inclination varies continuously, but is not constant, see FIG. 2. In fact, its slope only varies slightly in the first part A, while its slope increases significantly in part B and is almost zero in part C, where the bottom panel 6b operates in conjunction with a fixed transverse vertical panel 13, independent from the section 12b, to form a second transverse aperture 8b. This aperture is located at a lower level and farther back than the vertical panel 13 of the rear oil-receiving chamber 9. The purpose of the intake channel 4 is to convey the floating oily substance carried by the water stream towards the internal part of the platform and to present it almost stationary when it reaches a mobile skimming device 10.

In other words, the entire apparatus exploits the properly selected inclination of the bottom panels 6a and 6b, as well as the transverse apertures 8a and 8b, when the surface oil layer runs through the channel 4. In fact, a progressive increase of the water thickness or depth (distance between liquid surface and channel bottom) that enters the intake channel 4 will proportionally slow down the oil since its flow volume is constant, while the water, which entered inside the channel 4 together with the oil, flows along the bottom of the channel, and will flow out of the stream through the apertures 8a and 8b.

Figure 3:
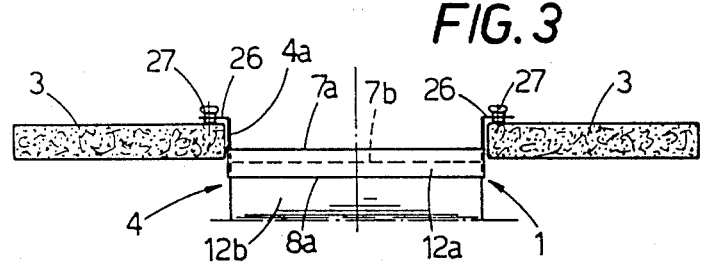
FIG. 3 shows a transverse sectional view (taken on line A—A of FIG. 4) of the water-skimming platform.
Figure 4:
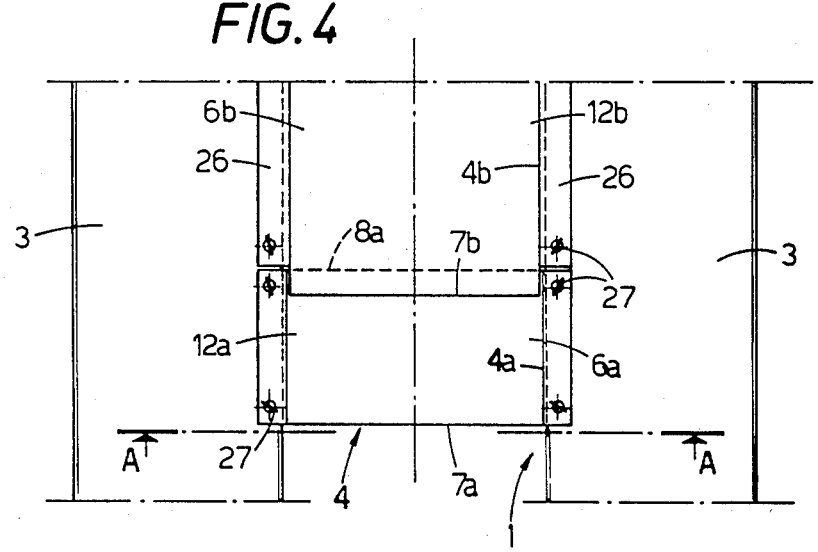
FIG. 4 is a top plan view of the front portion of the water-skimming platform.
Figure 5:
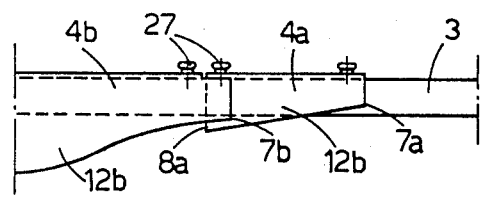
FIG. 5 is a side elevation of the intake channel.

The inclination and depth of the two bottom panels 6a and 6b, and, consequently, of the two thresholds 7a and 7b, can be adjusted by appropriate controls (see FIGS. 3 and 5). For this purpose, the two main sections of the intake channel are constructed so that the side panels 4a and 4b are fitted with two horizontal flanges 26 (at 90° to the side panels themselves) whose ends contain four threaded holes housing four threaded bolts 27 (winged type). Therefore, by turning these bolts, the corresponding section, which is supported by the two floats 3, is either lifted or lowered, making it possible to set the desired depth of the two thresholds 7a and 7b and slope of the respective bottom panels 6a and 6b.

The illustrated construction is intended to cope with fluids having a velocity typically less than 3 to 4 knots. In this case, the proposed two-section (12a, 12b) channel could suffice. In the first section 12a, the slope of the bottom panel 6a, which depends on the velocity of the water, can be between 5° to 15° to the horizontal. Under these conditions, such inclination will be sufficient to slow down the water's velocity significantly, depending on the thickness gradient of the oily layer.

With the body of water slowed down and with the oily layer's thickness increased, the polluted water reaches the second threshold 7b which completes the skimming process. At the same time, most of the water flows out through the aperture 8a. It follows that all the oily layer, together with a small quantity of water, reaches the last section 12b. In this section, the liquid mass is further slowed down in part A, until it almost stops in part B. The last part of section 12b is crossed by the transverse vertical panel 13, which supports a hinged gate 10 leading to the rear chamber 9 whose bottom edge is slightly above part C of the bottom panel 6b, so as to form aperture 8b. Therefore, a mass of almost stationary oil will converge at the end of the intake channel 4 and in front of a barrier consisting of panel 13 and gate 10. The oily matter will be floating on the surface while the water would on the bottom and be released through the horizontal aperture 8b. Note that the need to be nearly horizontal is due to the necessity of ensuring that the fluid flows out of section 12b practically parallel to arrow F, i.e., the main current, without creating vortices.

The presence of such vortices in aperture 8b could produce, in fact, similar vortices in the liquid contained in section 12b of the intake channel 4. The transverse and longitudinal cross-sections of the rear chamber 9, at the end of the intake channel, are virtually rectangular, and the chamber's sides, rear end and bottom consist of fixed panels, while its front part coincides with the rigid panel 13, above which protrudes the mobile gate 10 hinged from its bottom edge to the top edge of panel 13 and whose top edge is at water level. The rear chamber 9 is fitted with pipe 11, connected to the pump, which is used to transfer the collected oils to the storage tanks or ground facilities.

The gate 10 includes a floating hollow body and is hinged, e.g., by means of a transverse flexible strap 14, to the top edge of panel 13, so that the threshold 10 can freely oscillate about the transverse axis X-Y. The gate 10 has a specific weight less than that of water, therefore, the hinge serves a dual purpose; first as a hinge, and second to prevent the threshold from floating upwards under hydrostatic pressure, thereby causing it to assume a vertical position when hydrostatic pressures on both sides of it are equal.

Concerning the auxiliary platform 2, this includes two support floats 15 connected to each other by the cross arms 16 and by a front double beam 24. The two floats 15 are set at a suitable distance apart so as to house the skimming platform 1 between them. Platform 1 is connected to the floats 15 slightly above the water line by elastic cables 17 that not only allow the two platforms to maintain the prescribed position with respect to each other, but also to float independently. Two box-type arms 18 are connected to two vertical shafts 21 fitted to the double beam 24: the two arms float on the body of water. These arms convey a large amount of surface fluid and direct it towards the intake channel 4. This is achieved in conjunction with the shaped front panels 3a of the floats 3 of platform 1. The arms are kept in position and apart by the staffs 19 that are fitted with controls for adjusting their operating radius and, therefore, the useful length of each staff 19 and the aperture of the arms on the longitudinal vertical axis of the equipment. This makes it possible to adjust the amount of surface liquid the equipment will cope with.

A vertical grid 20 is also supported by the front beam 24, to block any large objects such as pieces of wood, hay, cans, plastic containers, etc.

A grated bridge structure 23 is mounted on the floats 2, which is only partially visible in FIG. 1. This bridge structure provides access to and servicing of the skimming platform 1.

The equipment operates as follows: Having moored the equipment with its front opening towards the current, which flows in the direction of arrow F, a large amount of water is conveyed towards the intake channel 4. This is facilitated by the floating arms 18, and by the shaped front ends 3a of the floats 3. The polluted liquid thus is directed to the threshold 7a. This threshold is adjusted, using the winged bolts 27, at such a depth as to permit access of all the polluted liquid (in practice, threshold 7a is adjusted just below the thickness of the oily layer).

The waste liquid thus passes over the threshold 7a, penetrating into the section 12a of the intake channel 4. The lowering level of bottom panel 6a causes the incoming liquid to slow down, increasing the thickness of the liquid which has entered the intake channel 4 and that of the polluted liquid as well.

Successively, the second threshold 7b further skims the incoming liquid, since only the upper layers of the incoming liquid are allowed to proceed, while the water lying on the bottom of section 12a flows out through aperture 8a. Section 12b is therefore filled with a mass of liquid having a thick oily top layer. In this section, the mass of liquid is further slowed down, first in part A, and then more effectively in part B, becoming almost stationary as it reaches panel 13 and gate 10. Once again, the water lying on the bottom of this section freely flows out through aperture 8b, reuniting with the main stream in the direction of arrow F.

Figure 2:
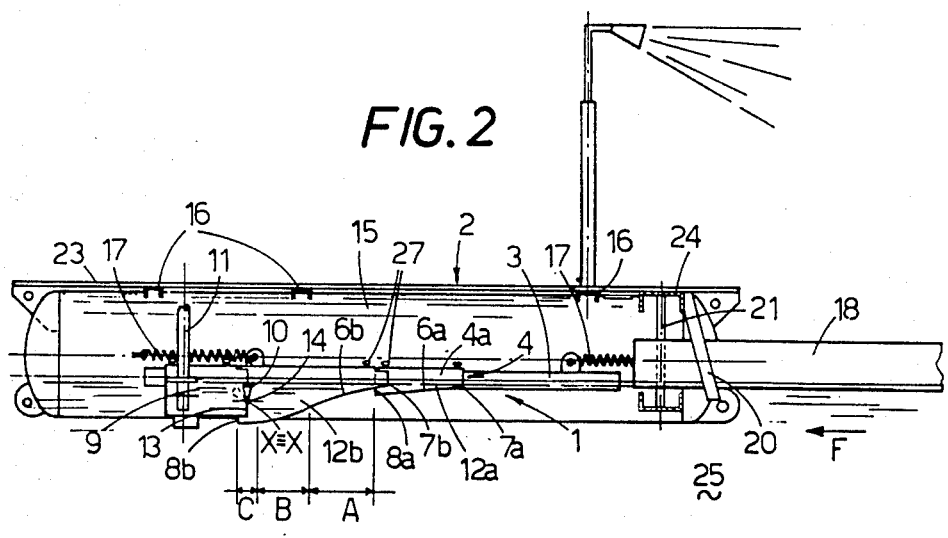
FIG. 2 shows a side view blow-up (the forward end being omitted)

Retrieval of the waste matter from the storage tank 9 is by suction pipe 11, which can transfer it to the ground facilities or storage tanks. When the system is positioned on a waterway, but not operating, i.e., the pump is not removing waste matter from the rear room, the water level in the chamber 9 coincides with the water level in the intake channel 4, in other words, the stream water level. Therefore, the hydrostatic pressures on both sides of the gate 10 are equal, and the gate is perfectly vertical as shown in FIG. 2, with its top edge coinciding with the water level 25. As soon as the pump starts up, the polluted liquid in the rear chamber is removed and the liquid level in this chamber gets lower. In this way, the hydrostatic pressures on the sides of the gate 10 become unbalanced. This causes the gate 10 to rotate about axis X—X towards the rear chamber 9, allowing sufficient opening to permit the oil layer to overflow into the rear chamber 9 from which it is retrieved by the suction pipe 11. The suction end of the pipe can be adjusted so that it removes only the waste liquid.

It is important to point out that when the current's velocity is greater than 3 or 4 knots, it is preferable to use a longer intake channel 4 with more than two sections. The last section of this channel will be basically identical to section 12b, as shown in the drawing, while the forward sections will be based on similar design concept adopted for section 12a. However, the slope of these latter sections will be basically constant and limited, and increasing progressively from one section to the next.

I claim:

1. Apparatus for the recovery of oily substances or similar products, floating on water courses, comprising: an independently floating skimming platform for the removal of the oil matter, an independently floating support platform connected to the skimming platform for independent floating movement relative to the skimming platform; the skimming platform including two lateral, symmetrical floats submerged only slightly under the water level and supporting a central structure comprising an intake channel which in turn has at least two sections operating in series, each of the intake channel sections having a threshold that can be adjusted to a desired depth, and a downwardly and rearwardly inclined bottom panel having an upper forward edge forming the lower boundary of said threshold, the slopes of the bottom panels generally increasing progressively in the direction of flow, the intake channel sections being positioned to provide a transverse aperture at the bottom rear edge of each section, a chamber positioned at the end of the intake channel fitted with a suction pipe connected to a pump for the retrieval of skimmed oily liquid from the chamber, the chamber being separated from the intake channel by a vertical, forward facing transverse front panel, whose bottom edge is slightly above the bottom panel of the last section of the intake channel, and a floating gate hinged to the top edge of the chamber front panel; the hinged gate mounted for oscillation about a transverse axis, depending on hydraulic pressure on opposite sides of the gate.

2. Apparatus, as claimed in claim 1, in which each section of the intake channel, except for the last section, has an inclined bottom with substantially constant slope, but which progressively increases from one section to the next in the direction of flow, the slope of the bottom last section only increases slightly in a front part, increases significantly in a middle part, and becomes almost horizontal in a last part which leads to the outlet aperture of the last section.

3. Apparatus, as claimed in claim 1, in which the depth of the thresholds leading to each section of the intake channel can be adjusted.

4. Apparatus, as claimed in claim 1, in which the floating gate has a specific gravity less than that of water and is hingedly connected at its bottom side by a flexible strip to the top edge of the chamber front panel.

5. Apparatus, as claimed in claim 1, in which a pipe is fitted with an adjustable pumping system.

6. Apparatus, as claimed in claim 1, in which the support platform includes two lateral floats connected to each other by staffs and cross-beams which can accommodate the water-skimming platform moored to its floats via elastic cables.

7. Apparatus, as claimed in claim 1, in which the support platform is fitted with two forward, floating arms openable outwards and including control means necessary to adjust the aperture of the arms.

* * * * *

UNITED STATES PATENT AND TRADEMARK OFFICE
CERTIFICATE OF CORRECTION

PATENT NO. : 4,511,470

DATED : April 16, 1985

INVENTOR(S) : Giuseppe Ayroldi

It is certified that error appears in the above-identified patent and that said Letters Patent is hereby corrected as shown below:

Column 5, Claim 1, line 4 delete "oil" and substitute therefor --oily--.

Signed and Sealed this

Twenty-second Day of October 1985

[SEAL]

Attest:

DONALD J. QUIGG

Attesting Officer

Commissioner of Patents and
Trademarks—Designate